United States Patent
Rentfrow

(10) Patent No.: US 12,188,552 B2
(45) Date of Patent: Jan. 7, 2025

(54) BEAM AXLE DRAIN BACK VALVE

(71) Applicant: Schaeffler Technologies AG & Co. KG, Herzogenaurach (DE)

(72) Inventor: Peter Rentfrow, Doylestown, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 26 days.

(21) Appl. No.: 18/115,166

(22) Filed: Feb. 28, 2023

(65) Prior Publication Data

US 2024/0288061 A1 Aug. 29, 2024

(51) Int. Cl.
| | |
|---|---|
| F16H 57/00 | (2012.01) |
| B60B 35/12 | (2006.01) |
| B60K 17/16 | (2006.01) |
| F16H 57/04 | (2010.01) |
| F16K 1/14 | (2006.01) |
| B60B 35/16 | (2006.01) |

(52) U.S. Cl.
CPC ....... *F16H 57/0443* (2013.01); *B60B 35/122* (2013.01); *B60K 17/165* (2013.01); *F16H 57/0483* (2013.01); *F16K 1/14* (2013.01); *B60B 35/16* (2013.01); *F16H 57/0454* (2013.01)

(58) Field of Classification Search
CPC ............. F16H 57/0423; F16H 57/0443; F16H 57/0424; F16H 57/0454
See application file for complete search history.

(56) References Cited

U.S. PATENT DOCUMENTS

| | | | | |
|---|---|---|---|---|
| 4,594,912 | A * | 6/1986 | Ishikawa | B60B 35/16 |
| | | | | 74/606 R |
| 5,197,929 | A * | 3/1993 | Scheiber | F16D 65/853 |
| | | | | 475/160 |
| 8,974,342 | B2 * | 3/2015 | Kwasniewski | F16H 57/045 |
| | | | | 475/160 |
| 9,267,596 | B2 * | 2/2016 | Trost | F16H 57/045 |
| 10,190,673 | B2 * | 1/2019 | Creech | F16H 57/0483 |
| 2017/0343118 | A1 * | 11/2017 | Balan | F16K 5/0636 |
| 2018/0149261 | A1 * | 5/2018 | Creech | F16H 57/0435 |

* cited by examiner

*Primary Examiner* — Victor L Macarthur
(74) *Attorney, Agent, or Firm* — Volpe Koenig

(57) ABSTRACT

An electric beam axle for use in an electric or hybrid motor vehicle includes a valve positioned between a differential case and an axle tube. The valve includes a valve housing with a fluid flow path extending through the valve housing, and a valve member positioned within the fluid flow path of the valve housing. The valve can also include a stop coupled to the valve housing, the stop being configured to retain the valve member within the fluid flow path of the valve housing. The valve member is configured to prevent fluid from flowing through the fluid flow path and into the axle tube of the electric beam axle when the electric or hybrid motor vehicle is driving across steep road grades and/or under lateral acceleration (cornering) events.

19 Claims, 3 Drawing Sheets

BEAM AXLE DRAIN BACK VALVE

FIELD OF INVENTION

The present disclosure concerns a beam axle for a motor vehicle. It is particularly concerned with an electric beam axle including a drain valve that controls lubricant distribution.

BACKGROUND

Electric beam axles are used in hybrid and electric motor vehicles to transfer rotational energy from the electric motor to the wheels of the vehicle, causing the vehicle to propel in a specified direction. Electric beam axles include the electric motor and the gearing/gearbox required to transfer the rotational energy from the electric motor to the wheels of the vehicle. When driving along or across steep road grades and under lateral acceleration (cornering) events, the fluid within the differential of the beam axle can flow from the sump of the differential into the axle tubes connected to the beam axle. If too much fluid flows from the differential into the axle tubes, the differential can be starved of fluid for a period of time. Non-electric beam axles utilize the fluid within the differential only as a lubricant and therefore can operate with a starved differential for limited periods of time without issue. Electric beam axles utilize the fluid in the differential as both a lubricant and a coolant. Therefore, operating an electric beam axle with a starved differential can cause issues for the electric beam axle, such as overheating.

As such, there is a need for an electric beam axle that prevents oil starvation of the differential when driving along/across steep road grades and under lateral acceleration (cornering) events.

SUMMARY

In one aspect, the present disclosure is directed to a beam axle. The beam axle includes a differential case, a differential gear set located in the differential case, an axle shaft extending from the differential gear set, and an axle tube extending from the differential case. The axle tube being concentric with and surrounding the axle shaft. The beam axle further includes a valve positioned between the differential case and the axle tube. The valve includes a valve housing including a fluid flow path extending through the valve housing. A valve member is positioned within the fluid flow path of the valve housing. The valve member being configured to selectively prevent a fluid from flowing through the fluid flow path and into the axle tube.

In one embodiment, the valve member is a ball.

In one embodiment, the valve further includes a stop coupled to the valve housing, the stop being configured to prevent the ball from escaping the fluid flow path.

In one embodiment, the stop has a smaller inner diameter than an outer diameter of the ball.

In one embodiment, the stop is a snap ring fixedly coupled to an inner surface of the fluid flow path of the valve housing.

In one embodiment, the fluid flow path of the valve housing includes a first portion including a first diameter and a second portion including a second diameter, and the second diameter is less than the first diameter.

In one embodiment, the first diameter of the first portion is greater than an outer diameter of the ball, and the second diameter of the second portion is less than the outer diameter of the ball.

In one embodiment, the second portion of the fluid flow path of the valve housing is positioned closer to the axle tube than the first portion of the fluid flow path of the valve housing.

In one embodiment, an angled surface extends between and connects the first portion of the fluid flow path to the second portion of the fluid flow path, the angled surface forming a seat for the valve member.

In one embodiment, the beam axle includes a first one of the valves positioned between the differential case and the axle tube on a first half of the beam axle, and a second one of the valves positioned between the differential case and the axle tube on a second half of the beam axle.

In one embodiment, a shaft seal is positioned between the axle shaft and the differential case, the shaft seal being concentric with and surrounds the axle shaft.

In one embodiment, the beam axle is an electric beam axle for an electric or hybrid motor vehicle.

In one embodiment, the beam axle is a full-floating beam axle.

In one embodiment, the valve housing is integrally formed in the differential case.

In one embodiment, the valve remains in an open position when a central axis of the beam axle is level, and the valve closes when the central axis of the beam axle is at an angle of at least 15 degrees from level.

In one embodiment, the fluid flowing through the fluid flow path of the valve housing is an oil.

According to another aspect, the disclosure is directed to a method for controlling a flow of lubrication in a beam axle of a motor vehicle. The method includes providing the beam axle of any of the previous embodiments, allowing the lubrication to flow between the differential case and the axle tube, and closing the valve when the beam axle is tilted by at least 15 degrees to prevent the lubrication from flowing from the differential case into the axle tube.

The method can further include opening the valve when the beam axle is tilted less than 15 degrees to allow the lubrication to flow between the differential case and the axle tube.

The method can further include retaining the lubrication within the differential case while the valve is closed.

In one embodiment, the beam axle is a full-floating electric beam axle for an electric or hybrid motor vehicle.

BRIEF DESCRIPTION OF THE DRAWING(S)

The foregoing Summary as well as the following Detailed Description will be best understood when read in conjunction with the appended drawings, which illustrate a preferred embodiment of the disclosure. In the drawings.

DETAILED DESCRIPTION

Figure 1A:
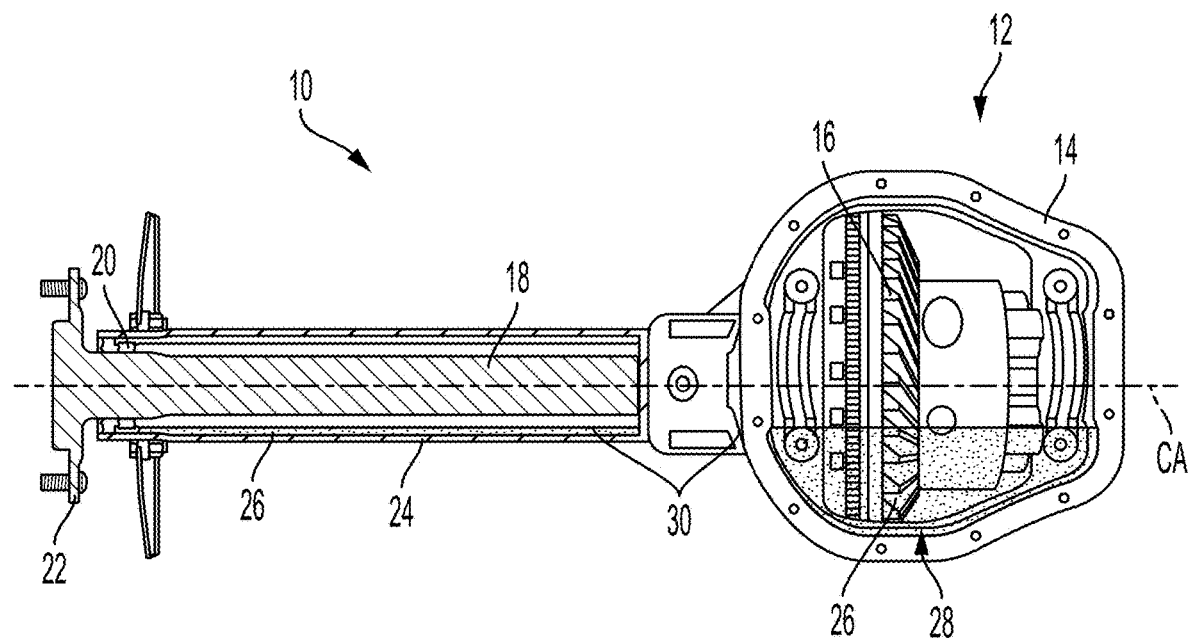
FIG. 1A is a partial cross-sectional view of half of a previous beam axle under normal operating conditions.

Certain terminology is used in the following description for convenience only and is not limiting. The words "front", "rear", "upper", and "lower" designate directions in the drawings to which reference is made. The words "inwardly" and "outwardly" refer to directions towards and away from parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terms "generally" and "approximately" are to be construed as within 10% of a stated value or ratio. The terminology includes the words specifically noted above, derivatives thereof, and words of similar import.

Figure 1B:
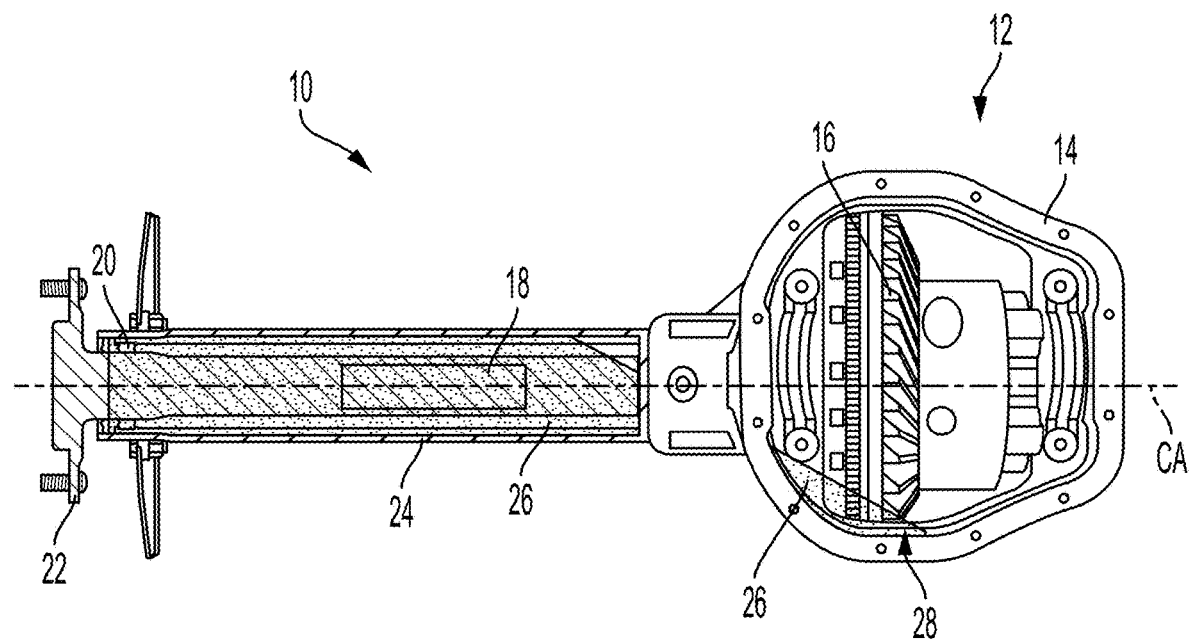
FIG. 1B is a partial cross-sectional view of half of the previous beam axle when driving along or across steep road grades and under lateral acceleration (cornering) events.

FIG. 1A is a partial cross-sectional view of half of a previous beam axle 10 under generally level operating conditions. FIG. 1B is a partial cross-sectional view of half of the previous beam axle 10 when driving along or across steep road grades and under lateral acceleration events, such as a cornering event. Although the figures and following disclosure focus on only one half of the previous beam axle 10, it is to be understood that the disclosure equally applies to the other half of the previous beam axle 10. As such, only one half of the previous beam axle 10 will be discussed in detail to avoid redundancy. Further, it is to be understood that the figures are not to scale and are for illustrative purposes only.

The previous beam axle 10 includes a differential 12 including a differential case 14 and a differential gear set 16 positioned within the differential case 14. An axle shaft 18 is coupled at a first end to the differential gear set 16, and the axle shaft 18 extends from the differential gear set 16 to a wheel bearing 20 and a wheel hub 22 positioned at a second end of the axle shaft 18. The axle shaft 18 is configured to transfer rotational energy from the differential gear set 16 to the wheel hub 22 to propel a motor vehicle in a specified direction. The previous beam axle 10 further includes an axle tube 24 extending from the differential case 14 to the wheel bearing 20 and/or the wheel hub 22. The axle tube 24 forms a fluid tight flow path for a fluid 26 to flow between the differential case 14 and the wheel bearing 20. More specifically, the differential case 14 of the previous beam axle 10 forms a sump 28 in a lower portion of the differential case 14. The sump 28 is the base or low point in the previous beam axle 10 which serves as a reservoir for the fluid 26 within the previous beam axle 10. In some examples, the fluid 26 within the previous beam axle 10 can be an oil or other lubrication for lubricating the components within the previous beam axle 10.

As illustrated in FIG. 1A, when the motor vehicle is in normal operating conditions in which the previous beam axle 10 is generally level with a flat ground surface (horizontal), the fluid 26 within the previous beam axle 10 can freely flow within the differential case 14 and the axle tube 24. In some examples, as illustrated, when the motor vehicle is in normal operating conditions in which the previous beam axle 10 is generally level with a flat ground surface, the fluid 26 within the previous beam axle 10 remains below a central axis CA of the axle tube 24 in each of the axle tube 24 and the differential case 14. As discussed, the fluid 26 within the previous beam axle 10 can be used to lubricate the differential gear set 16 and the wheel bearing 20, among other components within the previous beam axle 10. The fluid 26 within the previous beam axle 10 will remain at a generally constant fluid level 30 until an external force causes the fluid 26 to flow in one direction or the other within the previous beam axle 10.

FIG. 1B illustrates an example in which an external force causes the fluid 26 to flow in one direction within the previous beam axle 10. More specifically, FIG. 1B illustrates an event in which the motor vehicle is driving horizontally along or across a steep road grade or the motor vehicle is under a lateral acceleration event, such as a cornering maneuver. As illustrated, during such an event the fluid 26 within the differential case 14 of the previous beam axle 10 flows from the sump 28 of the differential case 14 into the axle tube 24 extending from the differential case 14. The previous beam axle 10 does not include any component or device that prevents the fluid 26 from flowing from the differential case 14 into the axle tube 24, and therefore the fluid 26 is free to flow between the differential case 14 and the axle tube 24 in the previous beam axle 10.

If the event causing the fluid 26 to flow from the differential case 14 into the axle tube 24 is sustained for a period of time, the majority of the fluid 26 within the previous beam axle 10 can flow into the axle tube 24. As such, during a sustained event the differential 12 can become starved of the fluid 26 until cessation of the event causing the fluid 26 to flow into the axle tube 24. Non-electric beam axles utilize the fluid 26 within the differential 12 only as a lubricant and therefore can operate with a starved differential 12 for limited periods of time without issue. On the other hand, electric beam axles utilize the fluid 26 within the differential 12 as both a lubricant and a coolant. Therefore, operating an electric beam axle with a starved differential 12 can cause issues for the electric beam axle, such as overheating. As such, there is a need for an electric beam axle that prevents fluid starvation of the differential 12 when driving along or across steep road grades and under lateral acceleration (cornering) events.

Figure 2:
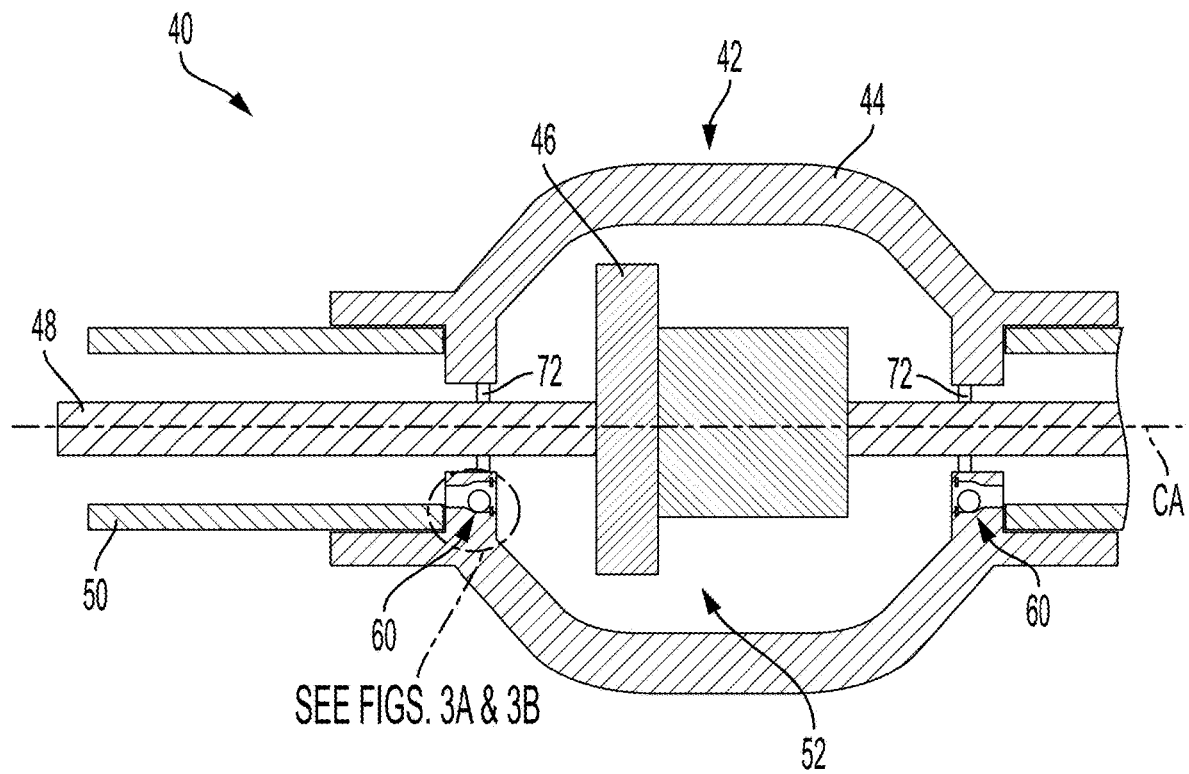
FIG. 2 is a cross-sectional view of a central portion of an exemplary electric beam axle of the present invention including a valve.

FIG. 2 is a cross-sectional view of a central portion of an electric beam axle 40 according to an exemplary embodiment. The electric beam axle 40 can include a differential 42 including a differential case 44 and a differential gear set 46 positioned within the differential case 44. An axle shaft 48 can be coupled to each axial end the differential gear set 46, and the axle shafts 48 can extend from the differential gear set 46 to a wheel bearing 54 (shown in FIG. 4) and a wheel hub 56 (shown in FIG. 4) positioned at a distal end of the axle shafts 48. The axle shafts 48 are configured to transfer rotational energy from the differential gear set 46 to the wheel hub 56 to propel an electric or hybrid motor vehicle in a specified direction. Although not illustrated, the electric beam axle 40 is understood to include an electric motor and gearing and/or a gearbox that transfers rotational energy from the electric motor to the differential gear set 46 and the axle shaft 48 of the electric or hybrid motor vehicle.

The electric beam axle 40 can further include an axle tube 50 coupled to and extending from the differential case 44 to the wheel bearing and/or the wheel hub. The axle tube 50 is coupled to the differential case 44 such that a fluid tight flow path is formed between the differential case 44 and the wheel bearing 54 at the distal end of each of the axle tubes 50. Further, the axle tube 50 can be arranged concentric with and surround the axle shaft 48 of the electric beam axle 40. The differential case 44 of the electric beam axle 40 forms a sump 52 in a lower portion of the differential case 44. The sump 52 is the base or low point in the electric beam axle 40 which serves as a reservoir for a fluid within the electric beam axle 40. In some embodiments, the fluid within the electric beam axle 40 can be an oil or other fluid lubrication for cooling and lubricating the components of the electric beam axle 40, discussed further below.

As illustrated in FIG. 2, the exemplary electric beam axle 40 can include a valve 60 positioned between the differential case 44 and the axle tube 50. In some embodiments, the electric beam axle 40 can include a first one of the valves 60 positioned between the differential case 44 and the axle tube 50 on a first half of the electric beam axle 40, and a second one of the valves 60 positioned between the differential case 44 and the axle tube 50 on a second half of the electric beam axle 40. In other words, a first one of the valves 60 can be positioned adjacent one axial end of the differential case 44 and a second one of the valves 60 can be positioned adjacent the other axial end of the differential case 44. Further, in some embodiments, the valve 60 can be formed integral with the differential case 44, such that the valve 60 is formed within and extends through a portion of the differential case 44 of the electric beam axle 40. In other embodiments, the valve 60 can be a separate component from the differential case 44 and the valve 60 can be coupled to the differential case 44 through a press fitting operation or a fastener, among other options. Further, the valve 60 can be positioned below a central axis CA of the axle shaft 48 when the electric beam axle 40 is in use.

Figure 3A:
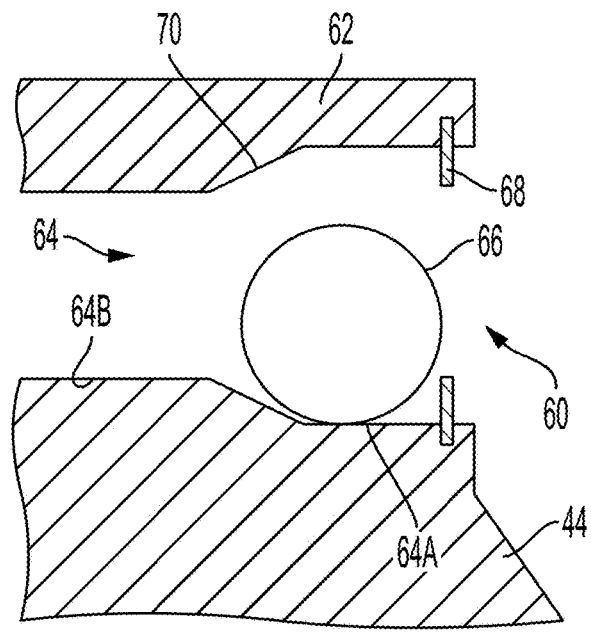
FIG. 3A is a magnified detailed view of the valve of the beam axle in an open position.
Figure 3B:
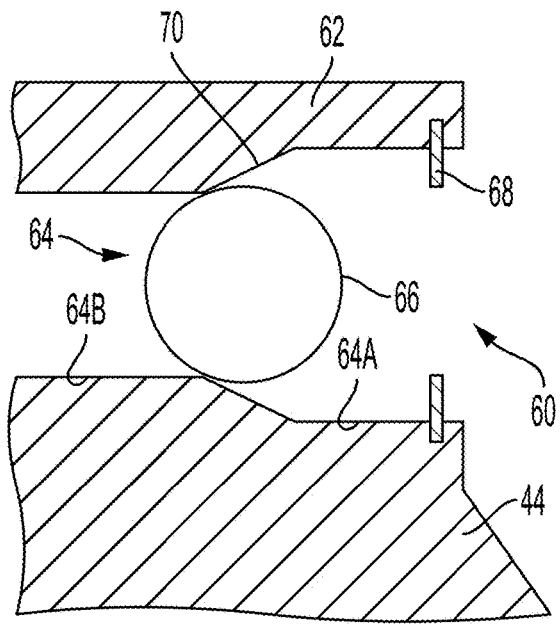
FIG. 3B is a magnified detailed view of the valve of the beam axle in a closed position.

FIG. 3A is a magnified detailed view of the valve 60 of the electric beam axle 40 in an open position. FIG. 3B is a magnified detailed view of the valve 60 of the electric beam axle 40 in a closed position. As illustrated, the valve 60 can include a valve housing 62 including a fluid flow path 64 extending through the valve housing 62, a valve member 66 positioned within the fluid flow path 64 of the valve housing 62, and a stop 68 coupled to the valve housing 62. The valve housing 62 is the main body or structural component of the valve 60 and the valve housing 62 forms the fluid flow path 64 extending through the valve housing 62. The fluid flow path 64 is an aperture that extends through the valve housing 62 and allows a fluid, such as an oil or other fluid lubricant, to flow through the valve housing 62. In some embodiments, as illustrated, the valve housing 62 can be integrally formed in the differential case 44, such that the valve housing 62 is a portion of the differential case 44. In other embodiments, the valve housing 62 can be a separate component from the differential case 44, and the valve housing 62 can be coupled to the differential case 44 through a press fitting operation or a fastener, among other options not specifically listed.

The fluid flow path 64 of the valve housing 62 includes a first portion 64A and a second portion 64B. The first portion 64A is positioned closer to the interior of the differential case 44 than the second portion 64B, and the second portion 64B is positioned closer to the axle tube 50 than the first portion 64A. Further, the first portion 64A includes a first diameter and the second portion includes a second diameter, with the second diameter of the second portion 64B being less than the first diameter of the first portion 64A. The first portion 64A and the second portion 64B can each be generally cylindrical apertures extending through the valve housing 62. In some examples, as illustrated, an angled surface 70 can extend between and connect the first portion 64A of the fluid flow path 64 to the second portion 64B of the fluid flow path 64. Further, in some examples, the angled surface 70 can form a seat for the valve member 66 to engage when the valve 60 is closed, discussed further below.

The valve member 66 is the component/feature of the valve 60 that is configured to selectively prevent a fluid, such as an oil or other fluid lubricant, from flowing though the fluid flow path 64 of the valve housing 62 and into the axle tube 50. In some embodiments, as illustrated, the valve member 66 can be a ball that is held within the fluid flow path 64 by the stop 68. More specifically, the stop 68 can be coupled to an inner surface of the first portion 64A of the fluid flow path 64, and the stop 68 can include an inner diameter that is smaller than an outer diameter of valve member 66 to prevent the valve member 66 (the ball) from escaping the fluid flow path 64. In some examples, the stop 68 can be a snap ring that is fixedly coupled to the inner surface of the first portion 64A of the fluid flow path 64. In other examples, the stop 68 can be any component or feature that is coupled to the valve housing 62 and prevents the valve member 66 from escaping the fluid flow path 64 while also allowing a fluid to flow through the stop 68 and into the first portion 64A of the fluid flow path 64.

In an embodiment in which the valve member 66 is a ball, the first diameter of the first portion 64A of the fluid flow path 64 can be greater than the outer diameter of the ball, allowing the ball to freely move within the first portion 64A of the fluid flow path 64. In addition, the second diameter of the second portion 64B of the fluid flow path 64 can be less than the outer diameter of the ball, preventing the ball from traversing fully into the second portion 64B of the fluid flow path 64. As shown best in FIG. 3B, the intersecting ends of the second portion 64B and the angled surface 70 of the fluid flow path 64 form a seat for the valve member 66 (ball) to engage when the valve 60 is in a closed position. As such, when the valve 60 is in a closed position the valve member 66 engages with the seat formed by the second portion 64B and the angled surface 70, and the valve member 66 is configured to prevent a fluid from entering and flowing through the second portion 64B of the fluid flow path 64. When the valve 60 is in an open position (FIG. 3A) the valve member 66 is disengaged from the seat formed by the second portion 64B and the angled surface 70, and a fluid can flow through the both the first portion 64A and the second portion 64B of the fluid flow path 64 and then into the axle tube 50 of the electric beam axle 40.

In other non-illustrated embodiments, the valve member 66 may not be a ball but instead may be a flap valve or a sliding cylinder valve. In such examples, the general functionality and purpose of the valve 60 remains the same as with the ball as the valve member 66, which is to selectively close the valve 60 to prevent a fluid from flowing between the differential case 44 and the axle tube 50, discussed further below. In an embodiment in which the valve member 66 is a flap valve, the flap valve could be coupled to the valve housing 62 and the flap valve could be biased toward an open position until an external force causes the flap valve to close and prevent a fluid from flowing between the differential case 44 and the axle tube 50. Further, in an embodiment in which the valve member 66 is a sliding cylinder valve, the sliding cylinder valve 60 could be coupled to the valve housing 62 and the sliding cylinder valve could be biased toward an open position until an external force causes the sliding cylinder valve to close and prevent a fluid from flowing between the differential case 44 and the axle tube 50.

In each embodiment, the valve 60 remains in an open position (FIG. 3A) during normal operation and use of the electric beam axle 40 within an electric or hybrid motor vehicle. Normal operation, in this instance, can be when the central axis CA of the axle shaft 48 is level, which can be generally parallel to a ground surface. When the valve 60 is in the open position, the oil or other fluid lubricant is free to flow between the differential case 44 and the axle tube 50 through the fluid flow path 64 of the valve 60. The valve 60 remains in an open position until an external force causes the valve 60 to transition into the closed position (FIG. 3B).

In one example, the external force could be caused by the electric or hybrid motor vehicle turning sharply and the momentum of the valve member 66 causes the valve member 66 to close on the opposite side of the electric or hybrid motor vehicle as the direction of the turn. For example, if the electric or hybrid motor vehicle turns sharply to the right, one or more valves 60 on the left side of the vehicle can transition from the open position to the closed position. If the electric or hybrid motor vehicle turns sharply to the left, one or more valves 60 on the right side of the vehicle can transition from the open position to the closed position. In some embodiments, each of the front axle and the rear axle of the electric or hybrid motor vehicle can include valves 60 on both the right and left sides of the vehicle. Therefore, in some embodiments, the electric or hybrid motor vehicle could include a total of four valves 60, with one on each side of both the front and rear axles. In other embodiments, either the front axle or the rear axle may only include the valves 60, depending on the specific application and requirements.

In another example, the external force could be a gravitational force acting on the valve member 66 when the electric beam axle 40 is utilized in an electric or hybrid motor vehicle that is driven along or across a steep hill or steep road grades. For example, if the electric or hybrid motor vehicle is driven from right to left in a forward direction of the vehicle across a steep hill or steep road grade, the gravitational force on the valve member 66 of the valve(s) 60 on the left side of the vehicle will transition from an open position to a closed position. If the electric or hybrid motor vehicle is driven from left to right in a forward direction of the vehicle across a steep hill or steep road grade, the gravitational force on the valve member 66 of the valve(s) 60 on the right side of the vehicle will transition from an open position to a closed position.

It is to be understood that the electric or hybrid motor vehicle does not need to be driving along or across the steep hill or steep road grade in a direction perpendicular to the incline. But rather the electric or hybrid motor vehicle can be traveling across the steep hill or steep road grade at any angle across the steep hill or steep road grade other than parallel with the incline for the valve 60 to transition from the open position to the closed position. Further, in one example, the valve 60 can transition from the open position to the closed position when the central axis CA of the electric beam axle 40 is tilted at an angle of at least 10 degrees with respect to level. In another example, the valve 60 can transition from the open position to the closed position when the central axis CA of the electric beam axle 40 is tilted at an angle of at least 15 degrees from level.

Referring again to FIG. 2, the electric beam axle 40 can also include a shaft seal 72. The shaft seal 72 can be positioned between the axle shaft 48 and the differential case 44 of the electric beam axle 40 on each axial end of the differential case 44. Further, the shaft seal 72 can be concentric with and surround the axle shaft 48 to prevent a fluid from flowing between the radial space between the axle shaft 48 and the differential case 44 during use on very steep hills or road grades. In some embodiments, the shaft seal 72 can be a dynamic seal. In other embodiments, the shaft seal 72 can be any other seal that can withstand rotational movement of the axle shaft 48 relative to the differential case 44. In each embodiment, the shaft seal 72 provides an extra sealing barrier that prevents oil or other fluid lubricant from flowing from the differential case 44 into the axle tube 50 when driving across steep road grades or under lateral acceleration (cornering) events. In some embodiments, the shaft seal 72 may not be included in the electric beam axle 40.

Figure 4:
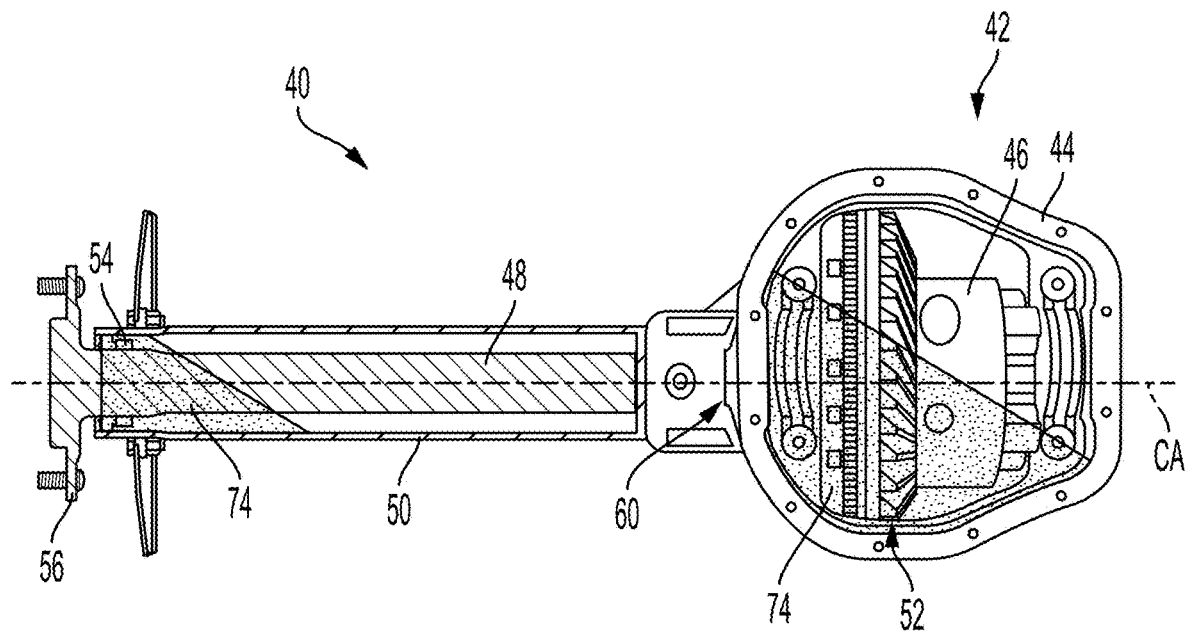
FIG. 4 is a partial cross-sectional view of half of the electric beam axle with the valve when driving along or across steep road grades and under lateral acceleration (cornering) events.

FIG. 4 is a partial cross-sectional view of half of the electric beam axle 40 including the valve 60 when driving along or across steep road grades and under lateral acceleration (cornering) events. As illustrated, when the electric or hybrid motor vehicle is driven across steep road grades and under lateral acceleration (cornering) events, the valve 60 transitions from the open position (FIG. 3A) to the closed position (FIG. 3B) and prevents the lubrication 74 from flowing from the differential case 44 into the axle tube 50. As such, and as illustrated in FIG. 4, when the valve 60 is in the closed position, the lubrication 74 is prevented from flowing into the axle tube 50 and a majority of the lubrication 74 will remain within the differential case 44.

The valve 60 is particularly advantageous for electric beam axles 40 including an electric motor because the lubrication 74 (oil or other fluid lubrication) within the differential case 44 is utilized as both a lubricant and as a cooling fluid. More specifically, in an electric beam axle 40 including an electric motor, the lubrication 74 within the electric beam axle 40 is utilized to lubricate the gearing and the wheel bearings within the electric beam axle 40, and also to cool and reduce the temperature of the electric motor itself. As such, preventing fluid starvation of the differential case 44 can prevent the electric motor from overheating and causing other issues within the electric beam axle 40 of the electric or hybrid motor vehicle. Further, the valve 60 is particularly advantageous for use in a full-floating beam axle, but the valve 60 could also be used in other axle embodiments such as a semi-floating beam axle, among other options. Therefore, as seen from the above disclosure, the electric beam axle 40 including the valve 60 is advantageous over previous beam axles because it prevents damage to the components of the electric beam axle 40 and extends the useful life of the components of the electric beam axle 40.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein. It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LOG OF REFERENCE NUMERALS

10 Previous Beam Axle
12 Differential
14 Differential Case
16 Differential Gear Set
18 Axle Shaft
20 Wheel Bearing
22 Wheel Hub
24 Axle Tube 26 Fluid
28 Sump
30 Fluid Level
40 Electric Beam Axle
42 Differential
44 Differential Case
46 Differential Gear Set
48 Axle Shaft
50 Axle Tube
52 Sump
54 Wheel Bearing
56 Wheel Hub
60 Valve
62 Valve Housing
64 Fluid Flow Path
64A First Portion
64B Second Portion
66 Valve Member
68 Stop
70 Angled Surface
72 Shaft Seal
74 Lubrication
CA Central Axis

What is claimed is:

1. A beam axle comprising:
a differential case;
a differential gear set located in the differential case;
an axle shaft extending from the differential gear set;
an axle tube extending from the differential case, the axle tube being concentric with and surrounding the axle shaft; and
a valve positioned between the differential case and the axle tube, the valve comprising:
a valve housing including a fluid flow path extending through the valve housing; and
a valve member positioned within the fluid flow path of the valve housing, the valve member being a ball that is configured to selectively prevent a fluid from flowing through the fluid flow path and into the axle tube.

2. The beam axle of claim 1, wherein the fluid flow path of the valve housing includes a first portion including a first diameter and a second portion including a second diameter, and wherein the second diameter is less than the first diameter.

3. The beam axle of claim 2, wherein the first diameter of the first portion is greater than an outer diameter of the ball, and wherein the second diameter of the second portion is less than the outer diameter of the ball.

4. The beam axle of claim 2, wherein the second portion of the fluid flow path of the valve housing is positioned closer to the axle tube than the first portion of the fluid flow path of the valve housing.

5. The beam axle of claim 2, wherein an angled surface extends between and connects the first portion of the fluid flow path to the second portion of the fluid flow path, the angled surface forming a seat for the valve member.

6. The beam axle of claim 1, further comprising:
a second valve positioned between the differential case and the axle tube, the second valve comprising:
a second valve housing including a fluid flow path extending through the second valve housing; and
a second valve member positioned within the fluid flow path of the second valve housing, the second valve member being configured to selectively prevent a fluid from flowing through the fluid flow path and into the axle tube;
wherein the beam axle comprises the valve positioned between the differential case and the axle tube on a first half of the beam axle, and the second valve positioned between the differential case and the axle tube on a second half of the beam axle.

7. The beam axle of claim 1, wherein the valve further comprises a stop coupled to the valve housing, the stop being configured to prevent the ball from escaping the fluid flow path.

8. The beam axle of claim 7, wherein the stop has a smaller inner diameter than an outer diameter of the ball.

9. The beam axle of claim 7, wherein the stop is a snap ring fixedly coupled to an inner surface of the fluid flow path of the valve housing.

10. A beam axle comprising:
a differential case;
a differential gear set located in the differential case;
an axle shaft extending from the differential gear set, wherein a shaft seal is positioned between the axle shaft and the differential case, the shaft seal being concentric with and surrounding the axle shaft;
an axle tube extending from the differential case; and
a valve being a ball positioned between the differential case and the axle tube, the valve being configured to selectively prevent a fluid from flowing from the differential case, through the valve, and into the axle tube, wherein the shaft seal is positioned radially between the axle shaft and the valve.

11. The beam axle of claim 10, wherein the beam axle is an electric beam axle for an electric or hybrid motor vehicle.

12. The beam axle of claim 10, wherein the beam axle is a full-floating beam axle.

13. The beam axle of claim 10, wherein the valve is integrally formed in the differential case.

14. The beam axle of claim 10, wherein the valve remains in an open position when a central axis of the beam axle is level, and wherein the valve closes when the central axis of the beam axle is at an angle of at least 15 degrees from level.

15. The beam axle of claim 10, wherein the fluid flowing through the fluid flow path of the valve housing is an oil.

16. A method for controlling a flow of lubrication in a beam axle of a motor vehicle, the method comprising:
providing the beam axle including a differential case, a differential gear set located in the differential case, an axle shaft extending from the differential gear set, and an axle tube extending from the differential case;
providing a valve positioned between the differential case and the axle tube, the valve comprising a valve housing including a fluid flow path extending through the valve housing and a valve member positioned within the fluid flow path of the valve housing, wherein the valve member is a ball that is configured to selectively prevent the lubrication from flowing through the fluid flow path and into the axle tube;
allowing the lubrication to flow between the differential case and the axle tube; and
closing the valve when the beam axle is tilted by at least 15 degrees from level to prevent the lubrication from flowing from the differential case into the axle tube.

17. The method of claim 16, further comprising opening the valve when the beam axle is tilted less than 15 degrees from level to allow the lubrication to flow between the differential case and the axle tube.

18. The method of claim 16, further comprising retaining the lubrication within the differential case while the valve is closed.

19. The method of claim 16, wherein the beam axle is a full-floating electric beam axle for an electric or hybrid motor vehicle.

* * * * *